(12) United States Patent
Lee et al.

(10) Patent No.: US 10,733,916 B2
(45) Date of Patent: Aug. 4, 2020

(54) ELECTRONIC TAG AND DRIVING METHOD THEREOF

(71) Applicant: E Ink Holdings Inc., Hsinchu (TW)

(72) Inventors: Yu-Ming Lee, Hsinchu (TW); Chuen-Jen Liu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/896,093

(22) Filed: Feb. 14, 2018

(65) Prior Publication Data

US 2019/0057626 A1 Feb. 21, 2019

(30) Foreign Application Priority Data

Aug. 16, 2017 (CN) .......................... 2017 1 0700410

(51) Int. Cl.
  *G09F 3/20* (2006.01)
  *G06F 3/147* (2006.01)
  *G09F 9/37* (2006.01)

(52) U.S. Cl.
  CPC .............. *G09F 3/208* (2013.01); *G06F 3/147* (2013.01); *G09F 9/372* (2013.01); *G09G 2330/023* (2013.01); *G09G 2380/04* (2013.01)

(58) Field of Classification Search
  CPC ... G06K 19/02; G06K 19/07722; G09F 3/208
  USPC ................................. 235/488, 487
  See application file for complete search history.

(56) References Cited

U.S. PATENT DOCUMENTS

| 6,753,830 | B2 | 6/2004 | Gelbman |
| 6,924,781 | B1 | 8/2005 | Gelbman |
| 7,658,329 | B2 | 2/2010 | Gelbman |
| 7,673,800 | B2 | 3/2010 | Gelbman |
| 7,677,454 | B2 | 3/2010 | Gelbman |
| 7,748,626 | B2 | 7/2010 | Gelbman |
| 7,748,627 | B2 | 7/2010 | Gelbman |

(Continued)

FOREIGN PATENT DOCUMENTS

| CN | 1734338 | 2/2006 |
| CN | 102738559 | 10/2012 |

(Continued)

OTHER PUBLICATIONS

Office Action of Taiwan Counterpart Application, dated Feb. 22, 2018, p. 1-p. 6, in which the listed references were cited.

(Continued)

*Primary Examiner* — Toan C Ly
(74) *Attorney, Agent, or Firm* — JCIPRNET

(57) ABSTRACT

An electronic tag including an electronic paper display, a driving circuit, and an energy harvesting device is provided. The electronic paper display is configured to display tag information. The driving circuit is coupled to the electronic paper display and includes a voltage detecting circuit. The energy harvesting device is coupled to the driving circuit and configured to generate a first power signal. The voltage detecting circuit is configured to receive the first power signal. When a voltage value of the first power signal is higher than a threshold voltage value, the voltage detecting circuit outputs the first output power signal so that the driving circuit enables the electronic paper display by the first output power signal. In addition, a driving method of the above electronic tag is also provided.

19 Claims, 7 Drawing Sheets

(56) References Cited

U.S. PATENT DOCUMENTS

| | | |
|---|---|---|
| 7,753,277 B2 | 7/2010 | Gelbman |
| 7,762,462 B2 | 7/2010 | Gelbman |
| 7,766,238 B2 | 8/2010 | Gelbman |
| 7,784,701 B2 | 8/2010 | Gelbman |
| 7,815,116 B2 | 10/2010 | Gelbman |
| 7,913,908 B2 | 3/2011 | Gelbman |
| 9,245,158 B2 | 1/2016 | Gudan et al. |
| 9,424,447 B2 | 8/2016 | Puleston et al. |
| 9,511,877 B2 | 12/2016 | Masson |
| 9,864,882 B1* | 1/2018 | Geist .................. G06K 7/10158 |
| 9,929,473 B2* | 3/2018 | Huang ................ H01Q 13/106 |
| 2002/0167500 A1 | 11/2002 | Gelbman |
| 2006/0006484 A1* | 1/2006 | Seneviratne .......... B81B 3/0016 257/415 |
| 2006/0232476 A1* | 10/2006 | Li ......................... H01Q 1/243 343/700 MS |
| 2007/0024551 A1 | 2/2007 | Gelbman |
| 2008/0303637 A1 | 12/2008 | Gelbman et al. |
| 2009/0014538 A1 | 1/2009 | Gelbman |
| 2009/0015427 A1 | 1/2009 | Gelbman |
| 2012/0287091 A1 | 11/2012 | Huang et al. |
| 2013/0187825 A1* | 7/2013 | Andujar Linares .... H01Q 1/243 343/853 |
| 2014/0071009 A1* | 3/2014 | Cheng .................... H01Q 13/10 343/770 |
| 2015/0270776 A1 | 9/2015 | Mallik et al. |
| 2016/0104938 A1* | 4/2016 | Hsu ...................... H01Q 13/106 343/767 |
| 2017/0222326 A1* | 8/2017 | Wight .................... H01Q 13/16 |
| 2017/0317511 A1* | 11/2017 | Keysar ................... H02J 7/355 |

FOREIGN PATENT DOCUMENTS

| | | |
|---|---|---|
| CN | 105404915 | 3/2016 |
| TW | 200609640 | 3/2006 |
| TW | M450011 | 4/2013 |
| TW | M473010 | 2/2014 |
| TW | M504309 | 7/2015 |

OTHER PUBLICATIONS

"Office Action of China Counterpart Application," dated Jun. 3, 2019, p. 1-p. 10.

* cited by examiner

ELECTRONIC TAG AND DRIVING METHOD THEREOF

CROSS-REFERENCE TO RELATED APPLICATION

This application claims the priority benefit of China application serial no. 201710700410.0, filed on Aug. 16, 2017. The entirety of the above-mentioned patent application is hereby incorporated by reference herein and made a part of this specification.

BACKGROUND OF THE INVENTION

Field of the Invention

The invention relates to a tag and particularly relates to an electronic tag and a driving method of the electronic tag.

Description of Related Art

With the development of the electronic tag, there have been increasing numbers of electronic tags applied to marking of various objects in order to provide relevant marking information of the corresponding object. For example, the electronic tag may be disposed on a trunk in which products, cargoes, or personal belongings are placed and configured to display relevant information thereof. A user can change the content displayed by the electronic tag by updating the data stored in the electronic tag. However, since the electronic tag in general needs to be powered by a battery or is only operable in a specific environment, the display function of the electronic tag is thus limited. Accordingly, it is an important issue at present to design an electronic tag capable of being operated to harvest energy in various environments or circumstances to convert the energy into an electric source, thereby providing an effective display function of the electronic tag. In view of the above, several embodiments of the invention are provided below as possible solutions.

SUMMARY OF THE INVENTION

The invention provides an electronic tag and a driving method of the electronic tag that harvest various kinds of energy from various kinds of energy sources to generate a power signal, and that enable an electronic paper display to display tag information. Consequently, the electronic tag of the invention is operable in various environments or circumstances.

The electronic tag of the invention includes an electronic paper display configured to display tag information, a driving circuit coupled to the electronic paper display and comprising a voltage detecting circuit, and an energy harvesting device coupled to the driving circuit. The energy harvesting device is configured to generate a first power signal, and the voltage detecting circuit is configured to receive the first power signal. When a voltage value of the first power signal is higher than a threshold voltage value, the voltage detecting circuit outputs the first power output signal so that the driving circuit enables the electronic paper display by the first power signal.

In an embodiment of the invention, the driving circuit further includes an energy storage device and a power supply. The energy storage device and the power supply are coupled to the voltage detecting circuit. When the voltage value of the first power signal is higher than the threshold voltage value, the voltage detecting circuit outputs the first output power signal to the energy storage device or the power supply.

In an embodiment of the invention, the power supply is coupled to the energy storage device and the electronic paper display. The power supply is configured to enable the electronic paper display according to the first power output signal provided by the voltage detecting circuit, or according to a second power signal provided by the energy storage device.

In an embodiment of the invention, the energy harvesting device includes a multi-input multi-output antenna and a first energy conversion module. The multi-input multi-output antenna is configured to receive at least one first radio frequency signal, and the first energy conversion module converts the at least one first radio frequency signal into a first sub power signal so that the first power signal comprises the first sub power signal.

In an embodiment of the invention, the driving circuit further includes a wireless communication module and a microcontroller, and the wireless communication module is coupled to the multi-input multi-output antenna. The microcontroller receives the at least one first radio frequency signal via the wireless communication module to obtain first tag data, so that the microcontroller, according to the first tag data, drives the electronic paper display to display the tag information.

In an embodiment of the invention, the multi-input multi-output antenna is a slot antenna, and the slot antenna is operated at at least one frequency band to receive the at least one first radio frequency signal corresponding to the at least one frequency band. The slot antenna includes a substrate, a metal layer, and a feeding component, and the metal layer is disposed on a first surface of the substrate and the feeding component is disposed on a second surface of the substrate. The metal layer includes a slot extending along a first direction, and a length of the slot is a sum of each quarter wavelength of the at least one frequency band so that the slot antenna is operated at the at least one frequency band.

In an embodiment of the invention, the energy harvesting device includes a near-field communication antenna and a second energy conversion module. The near-field communication antenna is configured to receive a second radio frequency signal, and the second energy conversion module converts the second radio frequency signal into a second sub power signal so that the first power signal includes the second sub power signal.

In an embodiment of the invention, the driving circuit further includes a wireless communication module and a microcontroller. The wireless communication module is coupled to the near-field communication antenna. The microcontroller receives the second radio frequency signal via the wireless communication module to obtain second tag data, so that the microcontroller drives the electronic paper display according to the second tag data to display the tag information.

In an embodiment of the invention, the energy harvesting device includes a gear mechanism, a mechanical energy conversion module, and a power converter. The mechanical energy conversion module is configured to convert mechanical energy provided by the gear mechanism into electrical energy and output a third sub power signal by the power converter so that the first power signal comprises the third sub power signal.

In an embodiment of the invention, the mechanical energy conversion module includes a motor device, and the gear mechanism is integrated with a shaft of a wheel of a container to generate the mechanical energy. The motor device converts the mechanical energy into the electrical energy.

In an embodiment of the invention, the energy harvesting device includes a solar cell and a regulator. The solar cell is configured to convert light energy into electrical energy and output a fourth sub power signal by the regulator so that the first power signal comprises the fourth sub power signal.

A driving method of the invention is adapted for an electronic tag. The electronic tag includes an electronic paper display and a driving circuit. The driving method of the electronic tag includes: generating a first power signal by an energy harvesting device, and providing the first power signal to a voltage detecting circuit of the driving circuit; when a voltage value of the first power signal is higher than a threshold voltage value, outputting a first power output signal by the voltage detecting circuit; and enabling the electronic paper display by the first power output signal outputted by the voltage detecting circuit, so that the electronic paper display displays tag information.

In an embodiment of the invention, the driving circuit further includes an energy storage device and a power supply, and the energy storage device and the power supply are coupled to the voltage detecting circuit. The step of enabling the electronic paper display by the first power signal outputted by the voltage detecting circuit includes: when the voltage value of the first power signal is higher than the threshold voltage value, outputting the first power output signal to the energy storage device or the power supply by the voltage detecting circuit; and enabling the electronic paper display by the power supply according to the first power output signal provided by the voltage detecting circuit, or according to a second power signal provided by the energy storage device.

In an embodiment of the invention, the energy harvesting device includes a multi-input multi-output antenna and a first energy conversion module. The step of generating the first power signal by the energy harvesting device includes: receiving at least one first radio frequency signal by the multi-input multi-output antenna; and converting the at least one first radio frequency signal into a first sub power signal by the first energy conversion module, so that the first power signal comprises the first sub power signal.

In an embodiment of the invention, the driving circuit further includes a wireless communication module and a microcontroller, and the wireless communication module is coupled to the multi-input multi-output antenna. The driving method of the electronic tag further includes: receiving the at least one first radio frequency signal by the wireless communication module so that the microcontroller obtains first tag data; and driving the electronic paper display by the microcontroller to display the tag information according to the first tag data.

In an embodiment of the invention, the energy harvesting device includes a near-field communication antenna and a second energy conversion module. The step of generating the first power signal by the energy harvesting device includes: receiving a second radio frequency signal by the near-field communication antenna; and converting the second radio frequency signal into a second sub power signal by the second energy conversion module, so that the first power signal comprises the second sub power signal.

In an embodiment of the invention, the driving circuit further includes a wireless communication module and a microcontroller, and the wireless communication module is coupled to the near-field communication antenna. The driving method of the electronic tag further includes: receiving the second radio frequency signal by the wireless communication module so that the microcontroller obtains second tag data; and driving the electronic paper display by the microcontroller to display the tag information according to the second tag data.

In an embodiment of the invention, the energy harvesting device includes a gear mechanism, a mechanical energy conversion module, and a power converter. The step of generating the first power signal by the energy harvesting device includes: converting mechanical energy, provided by the gear mechanism, into electrical energy by the mechanical energy conversion module, and outputting a third sub power signal by the power converter so that the first power signal comprises the third sub power signal.

In an embodiment of the invention, the energy harvesting device includes a solar cell and a regulator. The step of generating the first power signal by the energy harvesting device includes: converting light energy into electrical energy by the solar cell, and outputting a fourth sub power signal by the regulator so that the first power signal comprises the fourth sub power signal.

Based on the above, the electronic tag of the invention harvests various kinds of energy to generate the power signal. The electronic tag drives the electronic paper display by this power signal, and sources of the various kinds of energy may include radio frequency signals, light energy, and mechanical energy. Besides, the electronic tag of the invention obtains the tag data by receiving the radio frequency signal to enable the electronic paper display to display the tag information.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
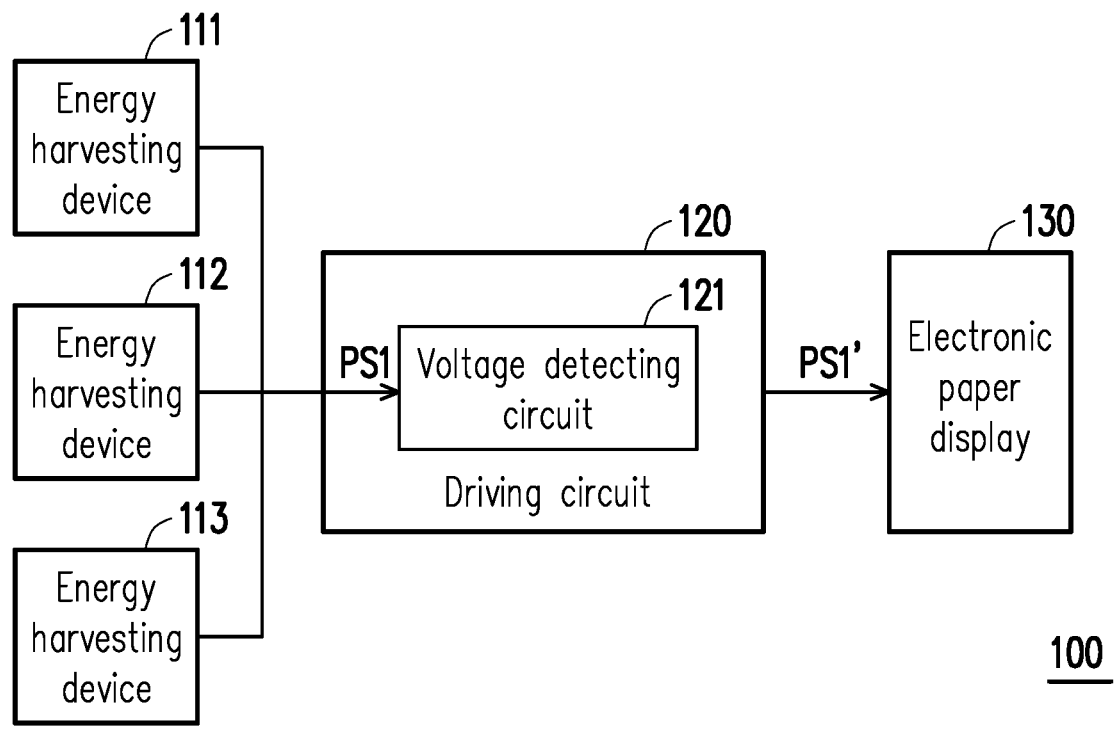
FIG. 1 illustrates a block diagram of an electronic tag according to an embodiment of the invention.

In order to make the invention more comprehensible, several embodiments are described below to illustrate the invention. However, it should be noted that the invention is not limited to the disclosed embodiments. Moreover, some of the embodiments may be combined where appropriate. Moreover, elements/components/steps with the same reference numerals are used to represent identical or similar parts in the figures and embodiments where appropriate.

FIG. 1 illustrates a block diagram of an electronic tag according to an embodiment of the invention. With reference to FIG. 1, in this embodiment, an electronic tag 100 includes a plurality of energy harvesting devices 111-113, a driving circuit 120, and an electronic paper display 130. The energy harvesting devices 111-113 are respectively coupled to the driving circuit 120. The driving circuit 120 includes a voltage detecting circuit 121 and is coupled to the electronic paper display 130. In this embodiment, the energy harvesting devices 111-113 are configured to convert different types of energy into a plurality of sub power signals respectively and integrate the sub power signals into a first power signal PS1. In this embodiment, the energy harvesting devices 111-113 output the first power signal PS1 to the voltage detecting circuit 121 so that the voltage detecting circuit 121 determines if a voltage value of the first power signal PS1 is higher than a threshold voltage value. Besides, when the voltage value of the first power signal PS1 is higher than the threshold voltage value, the voltage detecting circuit 121 outputs a first power output signal PS1' so that the driving circuit 120 enables the electronic paper display 130 by the first power output signal PS1'. However, the number of the power harvesting device in the invention is not limited to the number shown in FIG. 1. In one embodiment, the electronic tag 100 may include at least one energy harvesting device.

Figure 2:
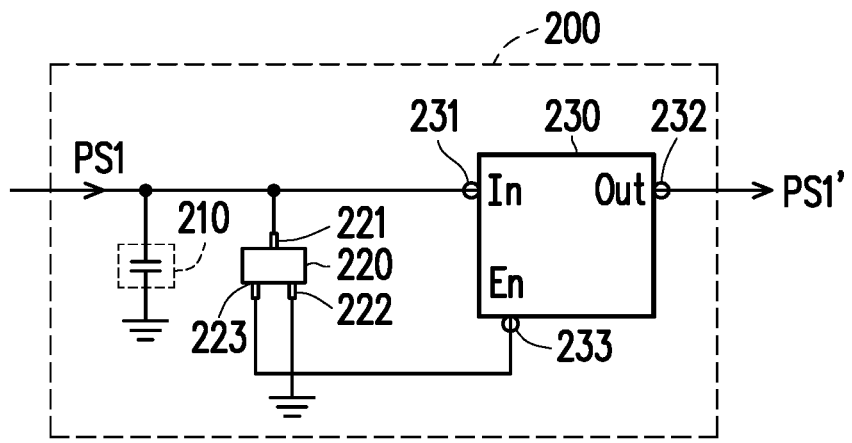
FIG. 2 illustrates a schematic circuit diagram of a voltage detecting circuit according to an embodiment of the invention.

FIG. 2 illustrates a schematic circuit diagram of a voltage detecting circuit according to an embodiment of the invention. With reference to FIG. 2, in this embodiment, a voltage detecting circuit 200 includes a capacitor 210, a voltage detector 220, and a switching component 230. The capacitor 210 and the voltage detector 220 are connected in parallel to each other. In this embodiment, a first terminal 221 of the voltage detector 220 and an input terminal 231 of the switching component 230 receive a first power signal PS1. A second terminal 222 of the voltage detector 220 is grounded. The voltage detector 220 is configured to determine if a voltage value of the first power signal PS1 is higher than a predetermined threshold voltage value. When the voltage value of the first power signal PS1 is higher than the predetermined threshold voltage value, the voltage detector 220 outputs an enable signal to an enable terminal 233 of the switching component 230 by a third terminal 223, so that the switching component 230 outputs a first power output signal PS1' by an output terminal 232. In this embodiment, the voltage detector 220 is, for example, a voltage comparator or a voltage regulator, but the invention is not limited thereto.

Figure 3:
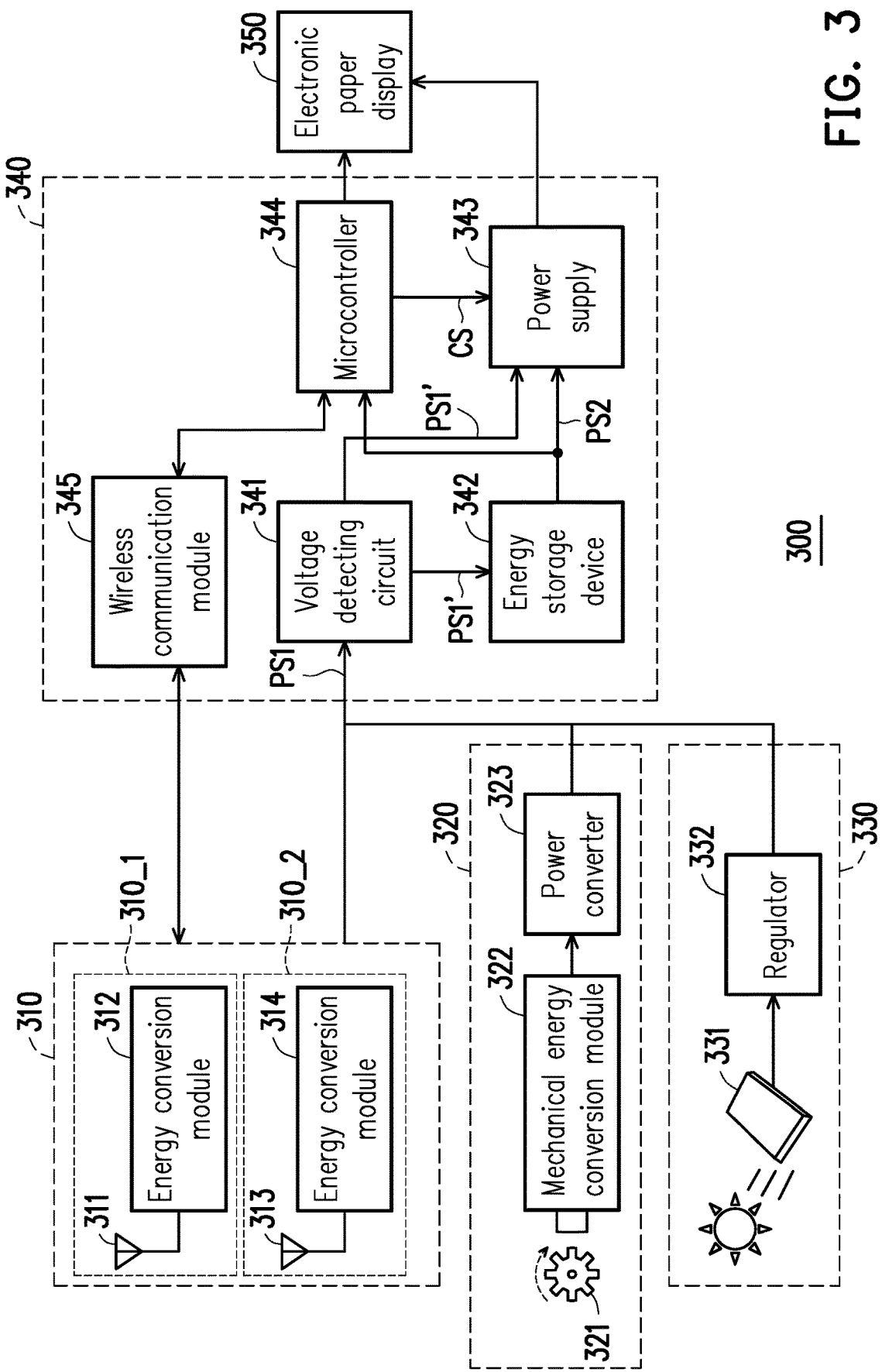
FIG. 3 illustrates a block diagram of an electronic tag according to another embodiment of the invention.

FIG. 3 illustrates a block diagram of an electronic tag according to another embodiment of the invention. With reference to FIG. 3, in this embodiment, an electronic tag 300 includes energy harvesting devices 310, 320, and 330, a driving circuit 340, and an electronic paper display 350, wherein the energy harvesting device 310 includes antenna modules 310_1 and 310_2. In this embodiment, the energy harvesting device 310 is configured to receive a RF (radio frequency) signal and convert the RF signal into a power signal. The energy harvesting device 320 is configured to generate mechanical energy and convert the mechanical energy into a power signal. The energy harvesting device 330 is configured to receive solar energy and convert the light energy into a power signal.

In this embodiment, the driving circuit 340 includes a voltage detecting circuit 341, an energy storage device 342, a power supply 343, a microcontroller 344, and a wireless communication module 345. In other words, in this embodiment, the driving circuit 340 harvests a variety of energy sources by the energy harvesting devices 310, 320, and 330, and the energy harvesting devices 310, 320, and 330 integrate a first power signal PS1 and output the first power signal PS1 to the voltage detecting circuit 341.

Specifically, in this embodiment, the antenna module 310_1 includes a multi-input multi-output (MIMO) antenna 311 and an energy conversion module 312. The MIMO antenna 311 is configured to receive a RF signal of at least one frequency band and output the RF signal to the energy conversion module 312. In this embodiment, the energy conversion module 312 includes a filter and a rectifier so that the RF signal is converted into a DC signal via the energy conversion module 312. The energy conversion module 312 is coupled to the voltage detecting circuit 341. The energy conversion module 312 is configured to use the DC signal as a first sub power signal and provide the signal to the voltage detecting circuit 341. In this embodiment, the MIMO antenna 311 is, for example, operated at a frequency band of 2.4 GHz based on Bluetooth Low Energy (BLE) communication protocols, but the invention is not limited thereto. In one embodiment, the MIMO antenna 311 may also be operated, for example, at frequency bands of 915 MHz or 5.25 GHz.

In this embodiment, the antenna module 310_2 includes a near-field communication (NFC) antenna 313 and an energy conversion module 314. The NFC antenna 313 is configured to receive a RF signal at a frequency band of 13.56 MHz and output the RF signal to the energy conversion module 314. In this embodiment, the energy conversion module 314 includes a filter and a rectifier so that the RF signal is converted into a DC signal via the energy conversion module 314. The energy conversion module 314 is coupled to the voltage detecting circuit 341. The energy conversion module 314 is configured to use a DC signal as a second sub power signal and provide the signal to the voltage detecting circuit 341.

In this embodiment, the energy harvesting device 320 includes a gear mechanism 321, a mechanical energy conversion module 322, and a power converter 323. The mechanical energy conversion module 322 is configured to convert mechanical energy provided by the gear mechanism 321 into electrical energy and output a third sub power signal by the power converter 323. The power converter 323 is coupled to the voltage detecting circuit 341 to provide this DC signal to the voltage detecting circuit 341. In this embodiment, the gear mechanism 321 is, for example, integrated with a shaft of a wheel of a container.

In this embodiment, the energy harvesting device 330 includes a solar cell 331 and a regulator 332. The solar cell 331 is configured to receive light energy and convert the light energy into electrical energy. The regulator 332 is coupled to the solar cell 331 and the voltage detecting circuit 341, and is configured to output a fourth sub power signal to the voltage detecting circuit 341 after the electrical power generated by the solar cell 331 is regulated.

It should be noted that, in this embodiment, the energy harvesting devices 310, 320, and 330 determine whether or not to generate at least one of the first sub power signal, the second sub power signal, the third sub power signal, and the fourth sub power signal according to the surrounding environment and the use state of the electronic tag 300. For example, if only the light source exists in the surrounding environment of the electronic tag 300, the electronic tag 300 may harvest light energy by the energy harvesting device 330 to generate the first power signal PS1. For another example, if the electronic tag 300 receives RF signals of a plurality of frequency bands, and the gear mechanism 321 provides mechanical energy to the mechanical energy conversion module 322 at the same time, the electronic tag 300 then may harvest the RF signals and the mechanical energy by the energy harvesting devices 310 and 320 to generate the first power signal PS1.

In this embodiment, the energy harvesting devices 310, 320, and 330 may output at least one of the first sub power signal, the second sub power signal, the third sub power signal, and the fourth sub power signal, and integrate the first power signal PS1 and output the first power signal PS1 to the voltage detecting circuit 341. In this embodiment, the voltage detecting circuit 341 is coupled to the energy storage device 342 and the power supply 343. The voltage detecting circuit 341 determines if a voltage value of the first power signal PS1 is higher than a predetermined threshold voltage value. In other words, when the power signals generated by the energy harvesting devices 310, 320, and 330 have enough voltage or current so that the voltage value of the first power signal PS1 is higher than the predetermined threshold voltage value, the voltage detecting circuit 341 then provides a first power output signal PS1' to the energy storage device 342 or to the power supply 343.

In this embodiment, the voltage detecting circuit 341 provides the first power output signal PS1' to the power supply 343. The power supply 343 is coupled to the microcontroller 344 and the electronic paper display 350. The microcontroller 344 controls the power supply 343 so as to operate the power supply 343 to drive the electronic paper display 350 by the first power output signal PS1' provided by the voltage detecting circuit 341, but the invention is not limited thereto. In one embodiment, if a voltage value or a current value of the first power output signal PS1' is not enough to drive the electronic paper display 350, the voltage detecting circuit 341 then provides the first power output signal PS1' to the energy storage device 342. The energy storage device 342 is coupled to the power supply 343 and the microcontroller 344. The microcontroller 344 controls the power supply 343 by a control signal CS so as to operate the power supply 343 to drive the electronic paper display 350 by a second power signal PS2 provided by the energy storage device 342. In other words, the electronic tag 300 has a wireless charging function. In addition, in this embodiment, the power supply 343 may include a DC-DC booster or a charge pump circuit, and the energy storage device 342 may be, for example, a super capacitor or a storage battery.

In this embodiment, the frequency bands respectively operated by the antenna modules 310_1 and 310_2 of the energy harvesting device 310 are also wireless communication frequency bands, such as a frequency band of 13.56 MHz based on NFC protocols, or a frequency band of 2.4 GHz based on BLE and Wi-Fi communication protocols. Consequently, in this embodiment, the antenna modules 310_1 and 310_2 may also be configured to receive data signals in a wireless manner, and provide the data signals to the wireless communication module 345. The wireless communication module 345, according to the data signals, outputs tag data to the microcontroller 344. In other words, in this embodiment, the microcontroller 344 obtains the tag data via the wireless communication module 345, and the microcontroller 344, according to the tag data, drives the electronic paper display 350 to display the corresponding tag information.

In this embodiment, the microcontroller 344 is, for example, a central processing unit (CPU), a system on chip (SOC) or other programmable microprocessors for general or special use, a digital signal processor (DSP), a programmable controller, an application specific integrated circuit (ASIC), a programmable logic device (PLD), other similar devices, or a combination of these devices. In addition, in this embodiment, the microcontroller 344 may further include a storage device for storing the tag data and a display driving circuit for driving the electronic paper display 350.

Figure 4:
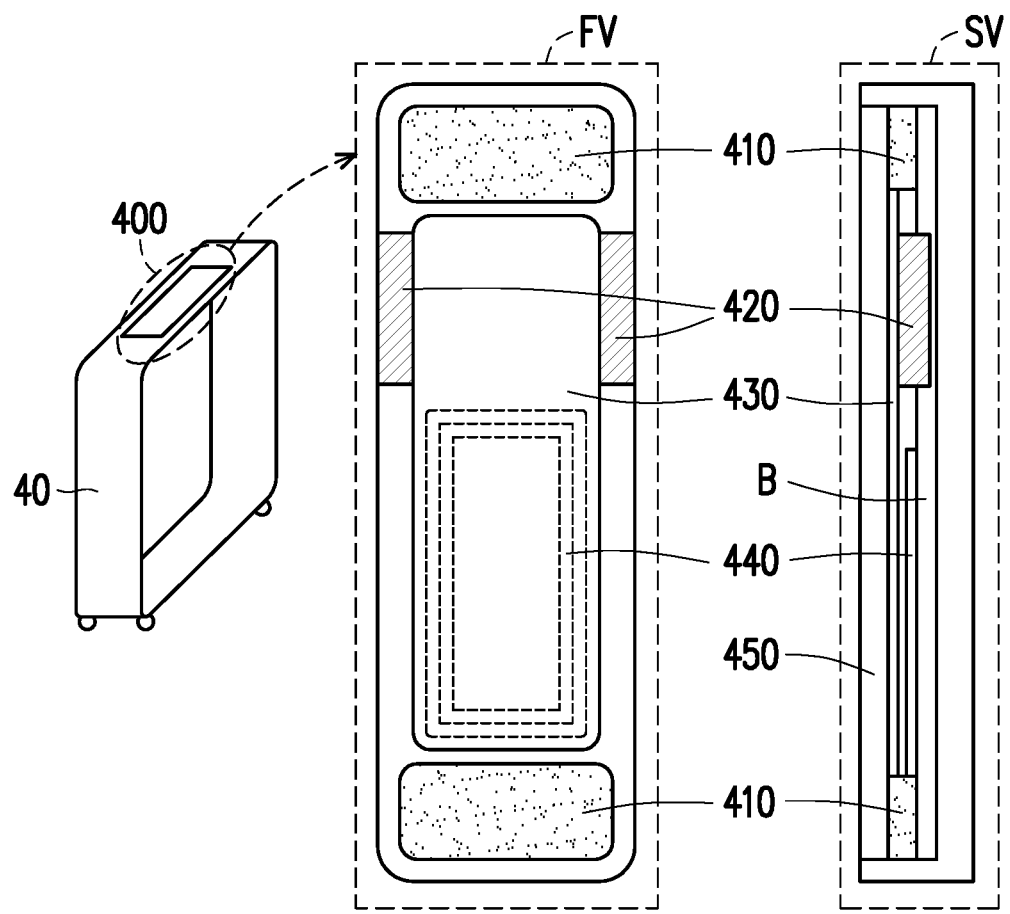
FIG. 4 illustrates a schematic view of an electronic tag and a container according to an embodiment of the invention.

FIG. 4 illustrates a schematic view of an electronic tag and a container according to an embodiment of the invention. With reference to FIG. 4, in this embodiment, an electronic tag 400 is disposed on a container 40. The container 40 is, for example, a luggage case, but the invention is not limited thereto. In a front view structure FV and a side view structure SV of the electronic tag 400, the electronic tag 400 includes a solar cell 410, a MIMO antenna 420, an electronic paper display 430, an NFC antenna 440, and a first substrate 450. In this embodiment, the solar cell 410, the MIMO antenna 420, the electronic paper display 430, the NFC antenna 440, and the first substrate 450 are respectively stacked on a substrate B, and accommodated inside a housing of the electronic tag 400.

In this embodiment, the arrangement of each component of the electronic tag 400 may be as shown in FIG. 4. The solar cell 410 is disposed on two sides of the substrate B, and the electronic paper display 430 is disposed at the center of the substrate B. In this embodiment, the MIMO antenna 420 is bendably disposed on the other two sides of the substrate B so as to have a better reception effect of RF signals. In this embodiment, the NFC antenna 440 is disposed on a printed circuit board (PCB), and is disposed on one side of the electronic paper display 430. However, the electronic tag of the invention is not limited thereto, and FIG. 4 is merely used as an example to illustrate an embodiment of an electronic tag.

Figure 5A:
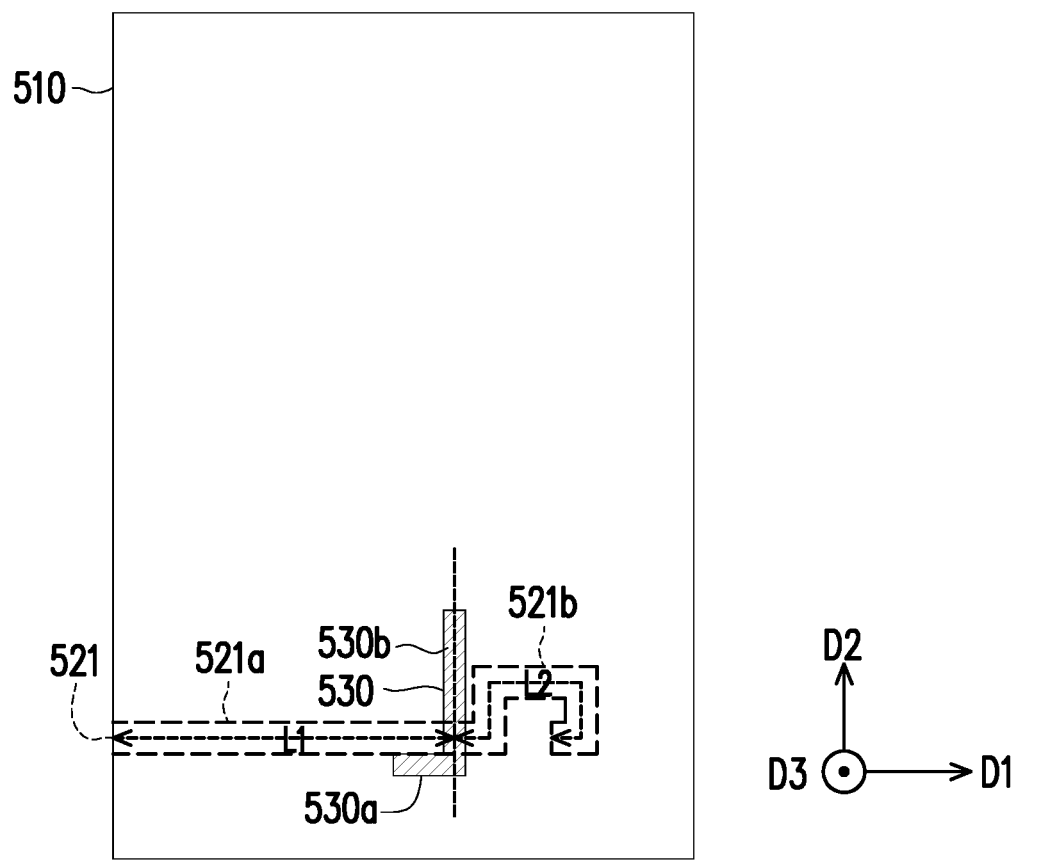
FIG. 5A illustrates a top view of a slot antenna according to an embodiment of the invention.
Figure 5B:
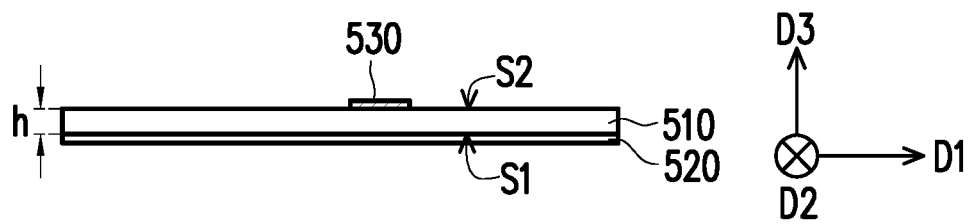
FIG. 5B illustrates a side view of a slot antenna according to an embodiment of the invention.

FIG. 5A illustrates a top view of a slot antenna according to an embodiment of the invention. FIG. 5B illustrates a side view of a slot antenna according to an embodiment of the invention. With reference to FIGS. 5A and 5B, a MIMO antenna in each embodiment of the invention may be a slot antenna 500, and the slot antenna 500 may be operated at at least one frequency band to receive at least one RF signal corresponding to the at least one frequency band. In this embodiment, a first direction D1, a second direction D2, and a third direction D3 are perpendicular to one another. In this embodiment, the slot antenna 500 includes a substrate 510, a metal layer 520, and a feeding component 530. In this embodiment, the metal layer 520 includes a slot 521, and an opening end of the slot 521 faces a side of the metal layer 520. It should be noted that, in this embodiment, the metal layer 520 is disposed on a surface S1 of the substrate 510 of the slot antenna 500, and the feeding component 530 is disposed on another surface S2 of the substrate 510. Consequently, in the third direction D3, a top view of the arrangement of the slot 521 and the feeding component 530 is as shown in FIG. 5A. In addition, in this embodiment, the substrate 510 may be, for example, a flexible substrate and has a thickness h, and the thickness h may be, for example, 0.4 mm, but the invention is not limited thereto. In one embodiment, the thickness h of the substrate 510 may be determined according to different frequency bands of the RF signals to be received.

In this embodiment, the slot 521 includes a section extending in the first direction D1 and a section extending in the second direction D2. In this embodiment, the slot 521 may be divided into a first section 521a and a second section 521b, and a length L1 of the first section 521a equals a length L2 of the second section 521b. Specifically, the first section 521a of the slot 521 is in a linear shape, and the second section 521b of the slot 521 is in a bending shape. In this embodiment, the second section 521b of the slot 521 includes three bending corners, but the invention is not limited thereto. In one embodiment, the bending manner of the second section 521b of the slot 521 may be determined according to the frequency bands of the received RF signals so as to provide a good matching property.

In this embodiment, the feeding component 530 has a first line segment 530a extending along the first direction D1 and a second line segment 530b extending along the second direction D2. In this embodiment, if a projection of the feeding component 530 is on the plane in which the slot 521 is located, a projection of the second line segment 530b of the feeding component 530 then crosses the slot 521. In this embodiment, the feeding component 530 may be designed to be in a L shape so that the slot antenna 500 may match the bandwidth property of the RF signals at each frequency band, but the invention is not limited thereto. In one embodiment, the feeding component 530 may also be in a linear shape. Besides, the slot antenna 500 also has a property of bendability so that it is convenient to dispose the slot antenna 500 in the electronic tag.

Figure 6:
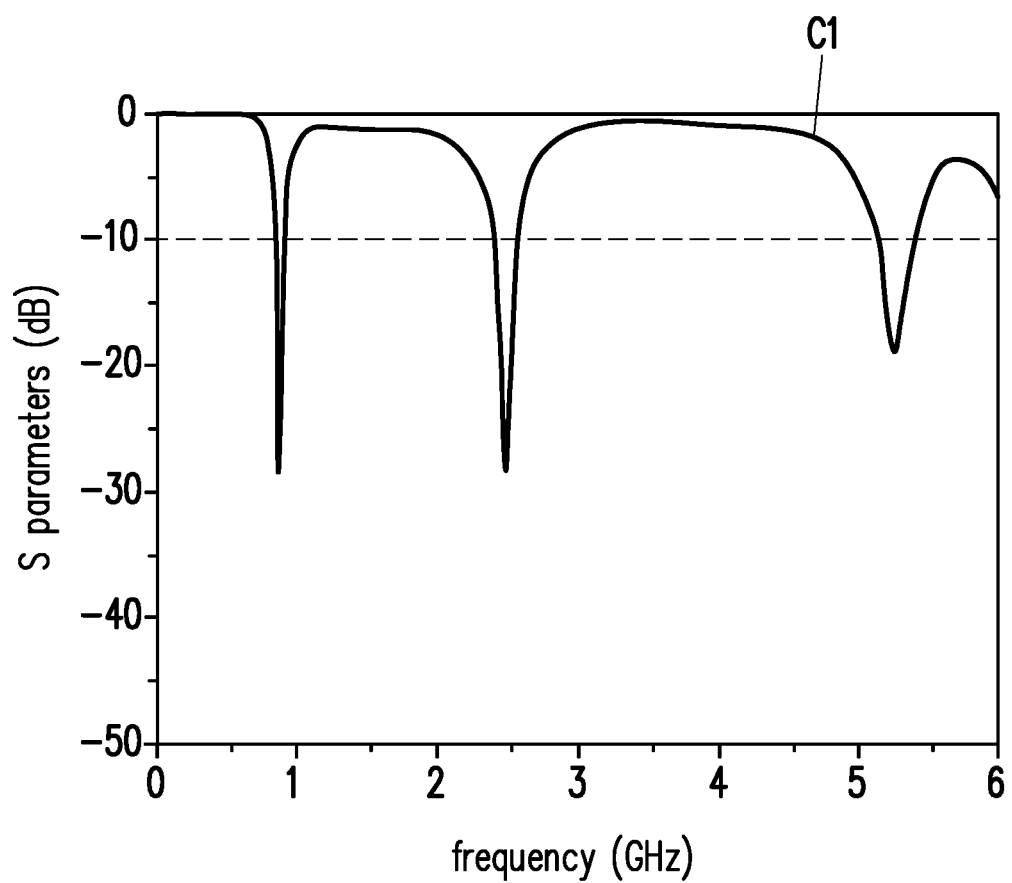
FIG. 6 is a diagram showing S parameters of the slot antenna in the embodiment of FIG. 5A and FIG. 5B.

FIG. 6 is a diagram showing S parameters of the slot antenna in the embodiment of FIG. 5A and FIG. 5B. With reference to FIG. 5A, FIG. 5B and FIG. 6, in this embodiment, a curve C 1 of FIG. 6 denotes an input return loss (S11) of the slot antenna 500 in the embodiment of FIG. 5A and FIG. 5B. Specifically, the slot antenna 500 may be configured to be operated at a plurality of frequency bands to receive RF signals of the plurality of frequency bands. For example, the slot antenna 500 may be operated at frequency bands of 915 MHz, 2.4 GHz and 5.25 GHz. As shown in FIG. 6, the input return losses of the frequency bands are all below −10 dB. In other words, the slot antenna 500 has a good bandwidth property and a good signal matching property at the frequency bands. In other words, in this embodiment, the slot antenna 500 may receive communication signals or receive RF signals configured to be converted into electrical power at the foregoing frequency bands.

Figure 7:
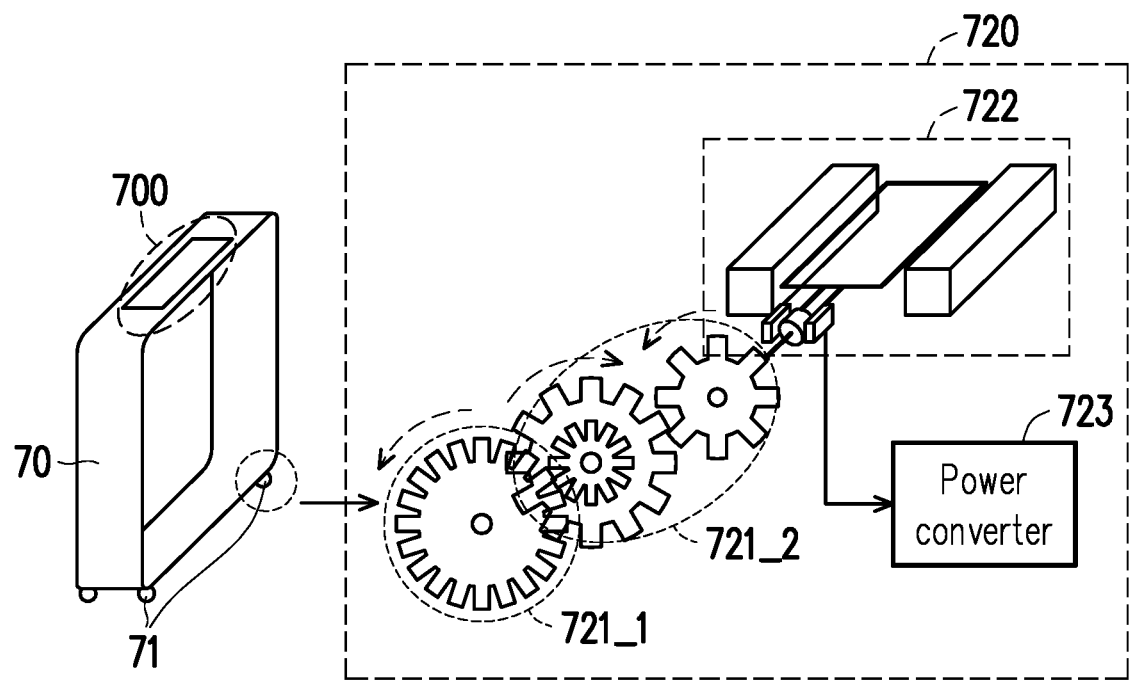
FIG. 7 is a schematic diagram of an energy harvesting device according to an embodiment of the invention.

FIG. 7 is a schematic diagram of an energy harvesting device according to an embodiment of the invention. With reference to FIG. 7, the electronic tag of each embodiment of the invention, for example, includes an energy harvesting device 720 as shown in FIG. 7. In this embodiment, an electronic tag 700 is disposed on a container 70, and the electronic tag 700 includes the energy harvesting device 720. In this embodiment, the energy harvesting device 720 includes gear mechanisms 721_1 and 721_2, a mechanical energy conversion module 722, and a power converter 723. The gear mechanism 721_1 is disposed on a wheel 71 of the container 70 to drive the gear mechanism 721_2. In this embodiment, the gear mechanisms 721_1 and 721_2 may be formed by combining a plurality of gears, and a gear ratio between the gears may be determined according to different power generation requirements, and the invention is not limited thereto.

In this embodiment, when the container 70 is moving forward, the wheel 71 and the gear mechanism 721_1 rotate synchronously, and the gear mechanism 721_1 drives the gear mechanism 721_2 to generate mechanical energy to be provided to the mechanical energy conversion module 722. In this embodiment, the mechanical energy conversion module 722 is, for example, a motor device. The motor device includes components such as a coil, a magnet, an electrical brush, and so on. However, implementation methods and structural details of the motor device may be understood sufficiently from the teachings, suggestions, and descriptions of the common knowledge of this field. Thus, details thereof are not repeated here. In this embodiment, the motor device converts the mechanical power provided by the gear mechanisms 721_1 and 721_2 into electrical power, and outputs the electrical power to the power converter 723. The power converter 723 converts an AC signal provided by the motor device into a DC signal, and outputs the DC signal to the voltage detecting circuit as described in each of the above embodiments.

Figure 8:
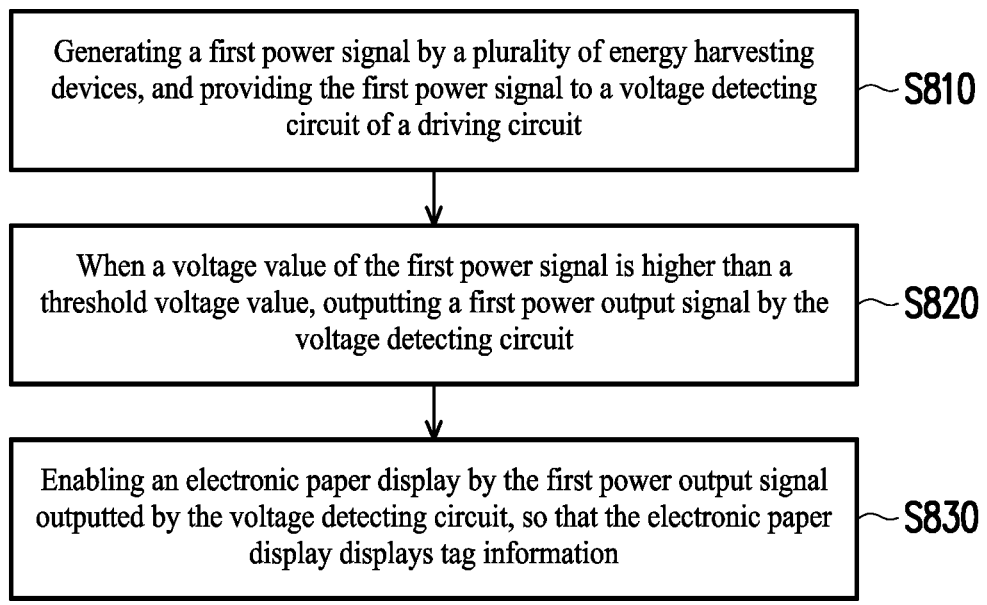
FIG. 8 illustrates a flowchart of a driving method of an electronic tag according to an embodiment of the invention.

FIG. 8 illustrates a flowchart of a driving method of an electronic tag according to an embodiment of the invention. With reference to FIG. 1 and FIG. 8, the driving method of the electronic tag in this embodiment is at least adapted for the electronic tag 100 of FIG. 1. In this embodiment, an electronic tag 100 is disposed on a container, and the electronic tag 100 includes an electronic paper display 130 and a driving circuit 120. In step S810, the electronic tag 100 generates a first power signal PS1 by a plurality of energy harvesting devices 111, 112, and 113, and provides a first power signal PS1 to a voltage detecting circuit 112 of the driving circuit 120. In step S820, when a voltage value of the first power signal PS1 is higher than a threshold voltage value, a first power output signal PS1' is outputted by the voltage detecting circuit 112. In step S830, by the first power output signal PS1' outputted by the voltage detecting circuit 121, the driving circuit 120 enables the electronic paper display 130 so that the electronic paper display 130 displays tag information. Consequently, in this embodiment, the electronic tag 100 may generate a power signal by the plurality of energy harvesting devices 111, 112, and 113, and drives the electronic paper display 130 so that the electronic paper display 130 displays the tag information. In addition, implementation methods and component characteristics regarding the electronic tag 100 may be understood sufficiently from the teachings, suggestions, and descriptions in the above embodiments of FIGS. 1-7. Thus, details thereof are not repeated here.

In summary, the electronic tag of the invention is disposed on the container, and harvests various kinds of energy in various use environments or circumstances to generate the power signal, and drives the electronic paper display to display the tag information. Herein the various kinds of energy include RF signals, light energy, and mechanical energy. In other words, the electronic tag of the invention may harvest energy in various use environments or circumstances in a wireless manner. Besides, the electronic tag of the invention also receives the data signal by the MIMO antenna or the NFC antenna and obtains the tag data so that the driving circuit of the electronic tag, according to the tag data, drives the electronic paper display to display the tag data.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. An electronic tag, comprising:
   an electronic paper display configured to display a tag information;
   a driving circuit, coupled to the electronic paper display and comprising a voltage detecting circuit; and
   an energy harvesting device, coupled to the driving circuit and configured to generate a first power signal,
   wherein the voltage detecting circuit is configured to receive the first power signal, and when a voltage value of the first power signal is higher than a threshold voltage value, the voltage detecting circuit outputs a first power output signal so that the driving circuit enables the electronic paper display by the first power output signal,
   wherein the energy harvesting device comprises a multi-input multi-output antenna, and the multi-input multi-output antenna is a slot antenna,
   wherein the slot antenna comprises a first section extending in a first direction and a second section extending in a second direction, wherein a first section length of the first section equals to a second section length of the second section,
   wherein the slot antenna comprises a feeding component for dividing the first section and the second section of the slot antenna, and the feeding component is a L shape,
   wherein the first section of the slot antenna is a linear shape and comprises an opening end, and the second section of the slot antenna is a bending shape and comprises a plurality of continuously bending corners.

2. The electronic tag according to claim 1, wherein the driving circuit further comprises an energy storage device and a power supply, and the energy storage device and the power supply are coupled to the voltage detecting circuit,
   wherein when the voltage value of the first power signal is higher than the threshold voltage value, the voltage detecting circuit outputs the first power output signal to the energy storage device or the power supply.

3. The electronic tag according to claim 2, wherein the power supply is coupled to the energy storage device and the electronic paper display; and the power supply is configured to enable the electronic paper display according to the first power output signal provided by the voltage detecting circuit, or according to a second power signal provided by the energy storage device.

4. The electronic tag according to claim 1, wherein the energy harvesting device comprises a first energy conversion module,
   wherein the multi-input multi-output antenna is configured to receive at least one first radio frequency signal, and the first energy conversion module converts the at least one first radio frequency signal into a sub power signal so that the first power signal comprises the sub power signal.

5. The electronic tag according to claim 4, wherein the driving circuit further comprises a wireless communication module and a microcontroller, and the wireless communication module is coupled to the multi-input multi-output antenna,
   wherein the microcontroller receives the at least one first radio frequency signal via the wireless communication module to obtain first tag data, and the microcontroller, according to the first tag data, drives the electronic paper display to display the tag information.

6. The electronic tag according to claim 4, wherein the slot antenna is operated at at least one frequency band to receive the at least one first radio frequency signal corresponding to the at least one frequency band, wherein the slot antenna comprises a substrate and a metal layer, and the metal layer is disposed on a first surface of the substrate, the feeding component is disposed on a second surface of the substrate,
   wherein the metal layer comprises a slot extending along a first direction, and a length of the slot is a sum of each quarter wavelength of the at least one frequency band, so that the slot antenna is operated at the at least one frequency band.

7. The electronic tag according to claim 1, wherein the energy harvesting device comprises a near-field communication antenna and a second energy conversion module,
   wherein the near-field communication antenna is configured to receive a second radio frequency signal, and the second energy conversion module converts the second radio frequency signal into a sub power signal, so that the first power signal comprises the sub power signal.

8. The electronic tag according to claim 7, wherein the driving circuit further comprises a wireless communication module and a microcontroller, and the wireless communication module is coupled to the near-field communication antenna,
   wherein the microcontroller receives the second radio frequency signal via the wireless communication module to obtain second tag data, so that the microcontroller drives the electronic paper display according to the second tag data, so that the electronic paper display displays the tag information.

9. The electronic tag according to claim 1, wherein the energy harvesting device comprises a gear mechanism, a mechanical energy conversion module, and a power converter,
   wherein the mechanical energy conversion module is configured to convert mechanical energy provided by the gear mechanism into electrical energy, and output a sub power signal by the power converter so that the first power signal comprises the sub power signal.

10. The electronic tag according to claim 9, wherein the mechanical energy conversion module comprises a motor device, and the gear mechanism is integrated with a shaft of a wheel of a container to generate the mechanical energy, wherein the motor device converts the mechanical energy into the electrical energy.

11. The electronic tag according to claim 1, wherein the energy harvesting device comprises a solar cell and a regulator,
   wherein the solar cell is configured to convert light energy into electrical energy, and output a sub power signal by the regulator, so that the first power signal comprises the sub power signal.

12. A driving method of an electronic tag adapting to the electronic tag, wherein the electronic tag comprises an electronic paper display and a driving circuit, the driving method of the electronic tag comprising:
   generating a first power signal by an energy harvesting device, and providing the first power signal to a voltage detecting circuit of the driving circuit;
   when a voltage value of the first power signal is higher than a threshold voltage value, outputting a first power output signal by the voltage detecting circuit; and
   enabling the electronic paper display by the first power output signal outputted by the voltage detecting circuit, so that the electronic paper display displays a tag information, wherein the energy harvesting device comprises a multi-input multi-output antenna, and the multi-input multi-output antenna is a slot antenna, wherein the slot antenna comprises a first section extending in a first direction and a second section extending in a second direction, wherein a first section length of the first section equals to a second section length of the second section, wherein the slot antenna comprises a feeding component for dividing the first section and the second section of the slot antenna, and the feeding component is a L shape, wherein the first section of the slot antenna is a linear shape and comprises an opening end, and the second section of the slot antenna is a bending shape and comprises a plurality of continuously bending corners.

13. The driving method of the electronic tag according to claim 12, wherein the driving circuit further comprises an energy storage device and a power supply, and the energy storage device and the power supply are coupled to the voltage detecting circuit, wherein the step of enabling the electronic paper display by the first power signal outputted by the voltage detecting circuit comprises:

when the voltage value of the first power signal is higher than the threshold voltage value, outputting the first power output signal to the energy storage device or the power supply by the voltage detecting circuit; and enabling the electronic paper display by the power supply according to the first power output signal provided by the voltage detecting circuit, or according to a second power signal provided by the energy storage device.

14. The driving method of the electronic tag according to claim 12, wherein the energy harvesting device comprises a first energy conversion module, and the step of generating the first power signal by the energy harvesting device comprises:

receiving at least one first radio frequency signal by the multi-input multi-output antenna; and converting the at least one first radio frequency signal into a sub power signal by the first energy conversion module, so that the first power signal comprises the sub power signal.

15. The driving method of the electronic tag according to claim 14, wherein the driving circuit further comprises a wireless communication module and a microcontroller, and the wireless communication module is coupled to the multi-input multi-output antenna, wherein the driving method of the electronic tag further comprises:

receiving the at least one first radio frequency signal by the wireless communication module, so that the microcontroller obtains first tag data; and driving the electronic paper display by the microcontroller to display the tag information according to the first tag data.

16. The driving method of the electronic tag according to claim 12, wherein the energy harvesting device comprises a near-field communication antenna and a second energy conversion module, and the step of generating the first power signal by the energy harvesting device comprises:

receiving a second radio frequency signal by the near-field communication antenna; and converting the second radio frequency signal into a sub power signal by the second energy conversion module, so that the first power signal comprises the sub power signal.

17. The driving method of the electronic tag according to claim 16, wherein the driving circuit further comprises a wireless communication module and a microcontroller, and the wireless communication module is coupled to the near-field communication antenna, wherein the driving method of the electronic tag further comprises:

receiving the second radio frequency signal by the wireless communication module, so that the microcontroller obtains second tag data; and driving the electronic paper display by the microcontroller to display the tag information according to the second tag data.

18. The driving method of the electronic tag according to claim 12, wherein the energy harvesting device comprises a gear mechanism, a mechanical energy conversion module, and a power converter, and the step of generating the first power signal by the energy harvesting device comprises:

converting mechanical energy provided by the gear mechanism into electrical energy by the mechanical energy conversion module, and outputting a sub power signal by the power converter, so that the first power signal comprises the sub power signal.

19. The driving method of the electronic tag according to claim 12, wherein the energy harvesting device comprises a solar cell and a regulator, and the step of generating the first power signal by the energy harvesting device comprises:

converting light energy into electrical energy by the solar cell, and outputting a sub power signal by the regulator, so that the first power signal comprises the sub power signal.

* * * * *